Patented Oct. 20, 1931

1,827,821

UNITED STATES PATENT OFFICE

GUSTAF NEWTON KIRSEBOM, OF TROLLHATTAN, SWEDEN

REDUCTION OF METAL COMPOUNDS

No Drawing. Application filed July 9, 1929, Serial No. 377,065, and in Sweden May 14, 1929.

This invention relates to the reduction of metallic compounds and has for its object the provision of improvements in the method of reducing metallic compounds. The invention relates more particularly to the treatment of such metallic oxides as are found in flue dusts, antimonial ores and dust, cadmium dust, slimes, caustic slags, etc., for the recovery of their metal values as well as for the recovery of valuable by-products associated with such materials.

In my copending applications Serial No. 293,709, filed July 18, 1928, and Serial No. 367,138 filed May 29, 1929, I have disclosed processes for treating various metals and/or their compounds more particularly with arsenic trioxide in the presence of an alkali metal compound to recover their metal values and certain by-products. While satisfactory results may be commercially obtained in the use of arsenic trioxide therein disclosed, the reduction of metal compounds is not as rapid as is to be desired. An appreciable amount of arsenic trioxide is, moreover, required to effect the reduction of the compounds. It is therefore apparent that from the viewpoint of efficiency and economy, the use of arsenic trioxide disclosed in the copending applications still leaves something to be desired.

In accordance with the practice of the present invention, metallic compounds and the like may be subjected to a reduction operation that is materially more efficient and more economical than the above-mentioned processes. According to the invention, metallic compounds are reduced by causing arsenic to react with a fused alkali metal compound in the presence of the metallic compound to be reduced.

When metallic arsenic is added to a molten bath of a caustic alkali compound, such as caustic soda, an alkali arsenite, such as sodium arsenite, is primarily formed under escape or evolution of hydrogen:

(1) $As + 3NaOH = Na_3AsO_3 + 3H$

If any reducible compound, such as a metallic oxide, is present in the caustic soda bath, the nascent hydrogen will reduce it:

(2) $MO + 2H = M + H_2O$ where M is a metal. In other words, when a mixture of arsenic and caustic soda is melted down together, or when arsenic is added to molten caustic soda, the resulting bath has strong reducing properties, such that metallic oxides present in or added to the bath can be reduced to their metallic state.

The sodium arsenite, formed in accordance with equation (1) above, is capable of further oxidation to sodium arsenate, while further amounts of the metallic oxide are reduced:

(3) $MO + Na_3AsO_3 = M + Na_3AsO_4$

As a result sodium arsenate can be produced free, or substantially free, from sodium arsenite, the formation of arsenite being prevented, or any arsenite forming being oxidized to arsenate. At the same time, the strongly reducing action resulting from the reaction of the arsenic and caustic soda is utilized for reducing metallic oxides to their metallic state.

As a result of my investigations, I have found that various metallic oxides can be reduced to their metallic state by the present process. Successful results have been obtained with such metallic oxides as those of lead, antimony, cadmium, bismuth, copper, nickel, cobalt, silver and gold. Since all of these metals, with the exception of silver and gold, lie on the electropositive side of metallic arsenic, it is apparent that the precipitation of these metals is not caused by electrolytic action, such as takes place when copper is precipitated from solutions of metallic iron.

In the case of all of the metallic oxides just mentioned, and others, when they are mixed with arsenic in proper proportions and melted with a proper excess of alkali metal compound, such as caustic soda, to form a fusible slag, the metal in each case collects at the bottom of the reaction vessel. The metal may be easily separated from the slag. Gold and silver are commonly found in small amounts along with lead or other base oxides, and when such base oxides are reduced by the present process, the gold and silver collect with the lead at the bottom of the receptacle.

Various metal alloys may then be recovered in the practice of the invention.

For purposes of illustration, the reaction of some of these metal oxides with arsenic in the presence of caustic soda may be set out as follows:

(4) $5PbO + 2As + 6NaOH = 5Pb + 2Na_3AsO_4 + 3H_2O$ (5) $5CdO + 2As + 6NaOH = 5Cd + 2Na_3AsO_4 + 3H_2O$ (6) $5Sb_2O_3 + 6As + 18NaOH = 10Sb + 6Na_3AsO_4 + 9H_2O$ (7) $5Bi_2O_3 + 6As + 18NaOH = 10Bi + 6Na_3AsO_4 + 9H_2O$

The process can be carried out in ordinary cast iron melting pots, in which is charged an intimate mixture of arsenic and the metallic oxide to be reduced, together with caustic soda in granulated or flaked form, and with subsequent heating of the mixture. The process may also be carried out by melting solid caustic soda to form a molten bath and introducing into the molten bath an intimate mixture of the arsenic with the metallic oxide; or, the arsenic may be added to a mixture of caustic soda and the metallic oxide to be treated. Caustic soda baths or slags containing metallic oxides can be subjected to the present process by adding arsenic thereto. Whichever procedure is followed, it should be remembered that arsenic is highly reactive and that unless the metal compounds to be reduced are present when the arsenic reacts with the caustic soda, the available reducing power is not fully utilized.

The temperature at which the process is carried out to effect the reduction of the metallic compounds can be varied. It should be above the melting point of the caustic soda, and in general I have used a temperature above that of the melting point of the oxide to be reduced. Temperatures up to around 400° C. or higher have been employed. When the intimate mixture is first made, and then heated to form the fused bath, the melting is accompanied with an ebullition due to the escape of water (steam) during the reaction, but without loss of oxides by dusting. The reaction takes place rapidly when the proper temperature is reached.

After the reduction of the metal compounds has taken place, the reduced metal can be drawn off in a molten form from the bottom of the melting pot through a suitable discharge outlet. The metal can be cast into suitable forms or can be mixed with other suitable metals, etc. The fused bath or slag remaining will contain the sodium arsenate. It can be granulated with water or run into molds and then dissolved in water in an iron tank. This slag also contains an excess of caustic soda. On dissolving the slag in water, the mixture is preferably treated in accordance with the disclosure made in my above mentioned copending application, Serial No. 293,709.

Metallic arsenic to be employed in the practice of the invention may be obtained either as native arsenic from mines, or by roasting arsenical pyrites with the exclusion of air. Blast furnace dust from lead furnaces, which often contain large amounts of metallic arsenic, may advantageously be employed in the practice of the invention. In such case the furnace flue dust may be added to the bath of caustic soda containing the metallic oxide to be reduced.

The practice of the present invention is particularly applicable to the reduction of such metallic compounds as are found in flue dusts, antimonial ores and dust, cadmium dust, slimes, caustic slags, etc. Such materials may in some instances be combined with advantage, after which the mixture is subjected to the treatment herein contemplated.

Flue dust, obtained from lead plants, for example, are particularly amenable to the practice of the present invention. Flue dust coming from the roaster furnaces generally contains considerable lead oxide. The lead may be recovered in metallic form. The blast furnace flue dust, on the other hand, contains considerable amounts of lead oxide as well as cadmium oxide. Such dusts may advantageously be treated in accordance with the practice of the present invention to recover a lead-cadmium alloy, which may then be suitably treated to effect the separation and recovery of the lead and the cadmium. For example, the lead-cadmium alloy may be charged into an electric refining furnace where the cadmium is fractionally volatilized off and collected. The vapor tension of the lead being very low at 776° C., which is the boiling point of cadmium, the condensed cadmium will be practically free of lead. A refined cadmium of 99.9% grade may be obtained in this manner. The last traces of cadmium may easily be removed by blowing air through the lead bath after refining, when the cadmium will gather on top of the bath as cadmium oxide which may be returned to the melting pot with a new charge.

Other flue dusts may, of course, be similarly treated. Some flue dusts from smelting or roasting operations may be high in antimony oxide or cadmium oxide, etc. When such flue dusts are treated according to the present process, the arsenic is converted into sodium arsenate and the reducible metallic oxides are reduced to their metallic state.

In the metallurgy of antimony, the first roast will usually produce a flue dust carrying a high-grade antimony oxide. A similar material is obtained as a by-product of the lead plants. Such products may be separately or jointly treated with arsenic and caustic soda in accordance with the present process. The antimony is recovered as a regulus. The antimonial ores themselves, in a roasted or oxidized condition, are advantageously treated according to the process of the invention.

The practice of the invention is also applicable to the treatment of slimes, such as are obtained, for example, in the so-called Betts process. Such slimes, after the removal of soluble lead, are mixed with a certain amount of crude arsenic and the mixture melted down with sufficient caustic soda to effect the reduction of the metallic compounds and to produce a fusible slag. The gold-silver-lead-antimony-bismuth-copper will collect as an alloy on the bottom of the reaction vessel, from which it may be removed. The alloy is next subjected to furnace oxidation, whereby the lead and antimony are first oxidized. The oxide slag is then brought back into the reaction vessel where the molten slag is kept, and by the suitable addition of arsenic and caustic soda the lead and antimony are reduced and recovered as a lead-antimony alloy. The remaining metal after the first oxidation, containing gold-silver-bismuth-copper, is then subjected to a second furnace oxidation step, and the resulting slag of bismuth oxide and copper oxide is then brought back to the slag in the reaction vessel. These oxides are subjected to further reduction with more arsenic and caustic soda, until the bismuth and copper settle to the bottom of the vessel as a regulus. The alloys obtained in both operations may be suitably treated for the separation and recovery of each of the metals. The final slag itself may be suitably treated for the separation and recovery of caustic soda, sodium arsenate, etc.

Such slimes as are obtained in the electrolytic refining of copper may also be treated according to the process of the present invention. After removing the soluble copper, the slimes are treated with arsenic and caustic soda in amount adapted to yield a metal alloy containing gold-silver-lead-nickel-antimony-copper or the like. This alloy is separated from the slag and is oxidized by furnace roasting to produce an oxide slag of lead and antimony. The oxide slag is preferably in part returned to the beginning of the process for reducing a new charge of slimes, with the object of having enough lead in circulation to produce a flowing metal. A part of the oxide slag is treated with the first slag with the addition of further amounts of arsenic and caustic soda to produce a lead-antimony alloy, which is suitably removed. The remaining metals are subjected to a second furnace roasting or oxidation operation, and the resulting slag is treated with further amounts of arsenic and caustic soda in accordance with the present invention.

The present invention may also with advantage be employed in the treatment of so-called Harris salts. In the process of refining lead according to the well-known Harris process, the lead is maintained in a molten state while circulating the same through a molten reagent or reagent mixture containing caustic soda with or without sodium chloride, sodium carbonate, sodium sulfate and the like to which is carefully added an oxidizing agent, such as sodium nitrate, until one or more of the impurities, such as arsenic, tin and antimony, has been oxidized and removed from the lead and is found in the resulting alkali slag. The lead itself is directly recovered in a substantially pure state. The impurities originally present in the lead remain suspended in the alkali slag.

The compounds present in the alkali slag generally comprise a mixture of the following: sodium antimonate, sodium arsenate, sodium stanate, sodium plumbate and other sodium salts, such as caustic soda itself, sodium oxide, sodium chloride, sodium carbonate, sodium sulfate and sodium nitrate.

According to the present invention, the caustic slags obtained in the Harris process of refining leads may be subjected to carefully regulated amounts of arsenic (and caustic soda, if more is necessary) whereby a regulus results containing one or more of the metals present in the mixture. The spent reagent or slag, containing one or more of the remaining metals and/or their compounds, may be further treated with further amounts of arsenic and caustic soda to reduce another metallic compound, which may be suitably separated and recovered from the remainder of the molten spent reagent.

The effect of the arsenic in the presence of caustic soda is to reduce the sodium nitrate present in the caustic slags to ammonia. The arsenic itself is oxidized to sodium arsenate. The reaction may be indicated as follows:

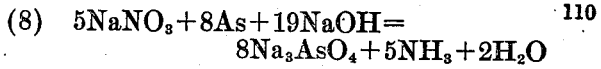

(8)  $5NaNO_3 + 8As + 19NaOH = 8Na_3AsO_4 + 5NH_3 + 2H_2O$

When all the sodium nitrate present in the caustic slag has been destroyed, the arsenic will react on the sodium antimonate (and the sodium plumbate, if present) to form antimony (and lead). These reactions may be set out as follows:

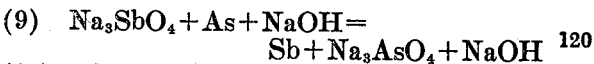
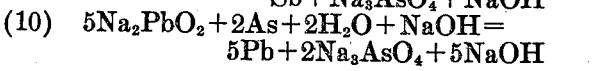

(9)  $Na_3SbO_4 + As + NaOH = Sb + Na_3AsO_4 + NaOH$

(10)  $5Na_2PbO_2 + 2As + 2H_2O + NaOH = 5Pb + 2Na_3AsO_4 + 5NaOH$

The reduced antimony and lead, along with any lead present in the salts, will separate and settle to the bottom of the reaction vessel, from which they may be removed as a lead-antimony alloy.

After the removal of the antimony (and lead, if present) more and more arsenic is gradually added to the molten mixture until it stiffens into a mass. At this stage of the process, the metal will have become saturated with respect to sodium arsenate, and the tin present in the mixture, in the absence of free caustic soda, will come out in the form of small tin prills. These tin prills may be removed from the melt by leaching away the soluble constituents of the mix. The prills are promptly removed from the spent reagent and are preferably at once melted into ingots. The remainder of the aqueous spent reagent containing sodium arsenate may be appropriately treated for the separation and recovery of the arsenate and caustic soda.

While the use of caustic soda in the treatment of various materials according to the present invention is set out above, it is to be understood that the principles of the invention are, however, not to be confined in the treatment of metallic compounds to that reagent in combination with arsenic; nor is the applicability of the process to be confined to the specific materials above described. The invention has a wider application. To those skilled in this art, various modifications of the practice of the invention will undoubtedly suggest themselves from time to time.

In the examples set out above, the use of metallic arsenic is indicated. It will of course be apparent to the man skilled in this art that the arsenic may be admixed with suitable compounds of arsenic, such as arsenic trioxide. In the preferred practice of the invention, however, it is aimed to use the metallic arsenic in preponderating amounts. It is therefore to be understood that in the claims below, the use of the term arsenic is to be interpreted as broadly covering arsenic, or arsenic and its compounds, such as arsenic trioxide, employable in the practice of the invention.

I claim:

1. The method of producing metallic lead or lead alloys from flue dust containing lead oxide and arsenic which comprises causing such flue dust to react with fused caustic soda to reduce lead oxide to metallic lead and to convert arsenic into sodium arsenate, and separating the reduced lead or lead alloy from the sodium arsenate melt.

2. The method of treating material containing lead oxide which comprises causing the lead oxide to react with a fused caustic alkali metal compound in the presence of arsenic whereby the lead oxide is reduced to metallic lead, and separating the resulting metallic lead from the alkali metal slag.

3. The method of treating material containing the oxides of lead, cadmium, and antimony, which comprises causing the oxides of lead, cadmium and antimony to react with a fused caustic alkali metal compound in the presence of arsenic whereby the oxides of lead, cadmium and antimony are reduced to metallic lead, cadmium and antimony, and separating the resulting metallic lead-cadmium-antimony alloy from the alkali metal slag.

4. The method of treating material containing the oxides of lead and antimony which comprises causing the oxides of lead and antimony to react with a fused caustic alkali metal compound in the presence of arsenic whereby the lead oxide and antimony oxide are reduced to metallic lead and antimony, and separating the resulting metallic lead and antimony from the alkali metal slag.

5. The method of treating caustic soda slags containing the oxysalts of lead, antimony and tin which comprises bringing the oxysalts of lead, antimony and tin into reactive relation with arsenic and caustic soda in amount to effect the reduction of the lead and antimony compounds to metallic lead and antimony, and to convert the tin compound to sodium stannate.

6. The method of treating caustic soda slag containing the oxysalts of lead and antimony which comprises bringing the oxysalts of lead and antimony into reactive relation with arsenic and caustic soda in amount sufficient to effect the reduction of the lead and antimony compounds to metallic lead and antimony, and separating the resulting lead-antimony alloy from the caustic soda slag.

7. The method of treating caustic soda slag containing the oxysalts of lead which comprises causing the oxysalt of lead to react with a fused caustic alkali metal compound in the presence of arsenic whereby the oxysalt of lead is reduced to metallic lead, and separating the resulting metallic lead from the alkali metal slag.

In testimony whereof I affix my signature.

GUSTAF NEWTON KIRSEBOM.